W. T. HILDRUP & A. TSCHOP.
Seed-Drill.
No. 208,599. Patented Oct. 1, 1878.
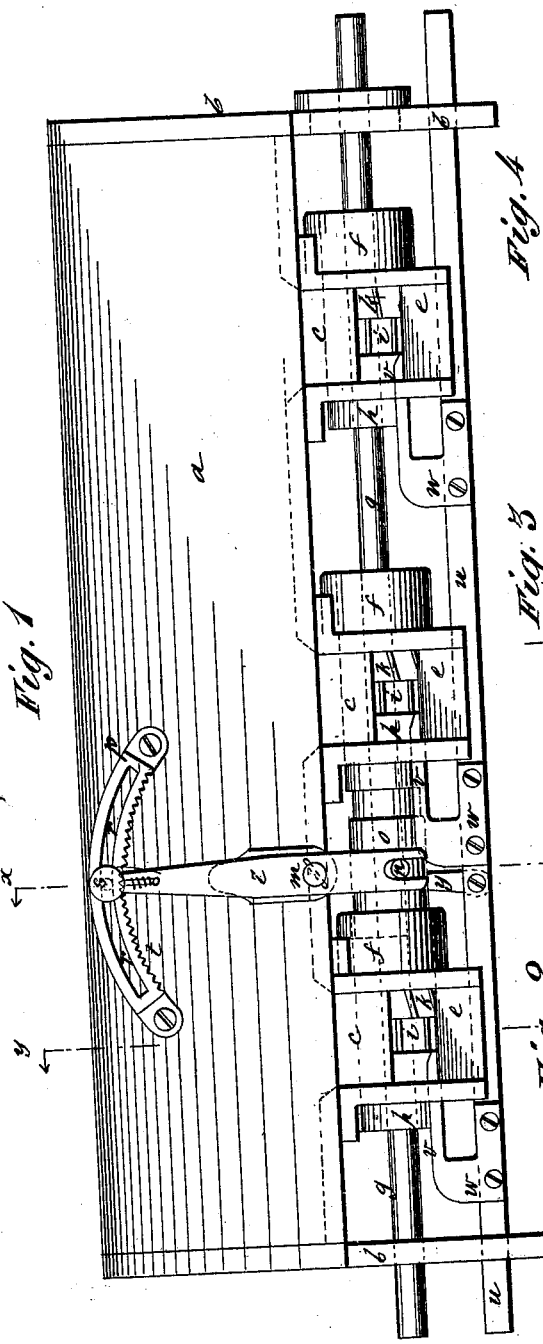
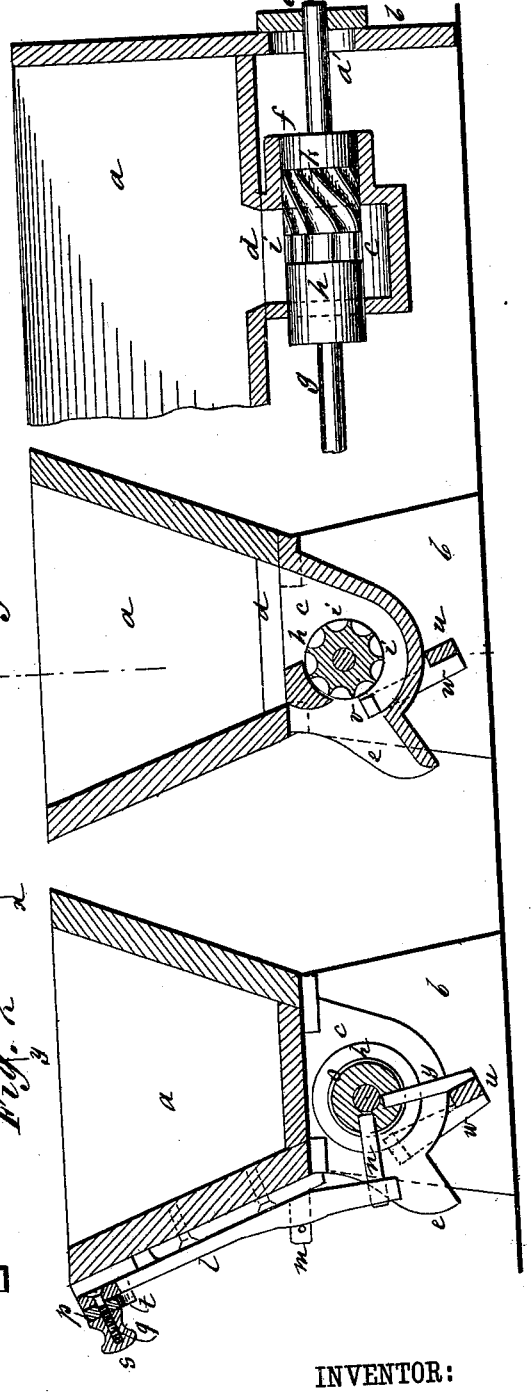

UNITED STATES PATENT OFFICE.

WILLIAM T. HILDRUP AND ALBERT TSCHOP, OF HARRISBURG, PA.

IMPROVEMENT IN SEED-DRILLS.

Specification forming part of Letters Patent No. 208,599, dated October 1, 1878; application filed August 7, 1878.

*To all whom it may concern:*

Be it known that we, WILLIAM T. HILDRUP and ALBERT TSCHOP, of Harrisburg, in the county of Dauphin and State of Pennsylvania, have invented a new and Improved Seed-Drill, of which the following is a specification:

Our invention relates to feeding devices for seeding-machines in which the seed is delivered by a revolving feed-roller.

The invention will first be described in connection with the drawings, and then pointed out in the claim.

In the accompanying drawings, Figure 1 is a front elevation of the hopper of a seeding-machine with our improved feeding device connected therewith. Fig. 2 is a cross-section of the same at the line $x\ x$. Fig. 3 is a cross-section at the line $y\ y$, and Fig. 4 is a section of one feed-box longitudinally of the feed-roller shaft.

Similar letters of reference indicate corresponding parts.

The seed-hopper $a$ is of usual shape and construction, and is supported upon the machine (not shown) by the end plates, $b$. $c\ c$ are the seed-boxes that are attached to the under side of hopper $a$, and $d$ are the openings from the hopper to the seed-boxes. The boxes $c$ are formed with circular bottoms, as shown, and with discharge-mouths $e$. Each of these boxes $c$ is formed at one side with a cup-shaped extension, $f$, in which the feed-rollers slide, as hereinafter described. The roller-shaft $g$ extends lengthwise of hopper $a$, beneath the same, and passes centrally through the boxes $c$. The ends of $g$ are supported by the end plates, $b$.

$h\ h$ are the feed-rollers, keyed upon the shaft $g$, and within the feed-boxes $c$. The cups $f$ are turned out true of a size to receive the rollers $h$, and the side of each box opposite to cup $g$ has a circular opening of the same diameter as the rollers $h$. The rollers $h$ are also turned smooth, and there is therefore no rough edge to cut the grain.

A portion of the surface of each roller $h$ equal to the width of discharge-mouth $e$ is grooved for the purpose of delivering the seed as the rollers are revolved. The ends of the rollers $h$ that slide in the cups $g$ is the grooved portion, and the said grooves are made parallel with the axis of rollers $h$ for about one-third the length of the feed, as seen at $i$, and the remainder of the distance the grooves are spiral, as seen at $k$. The grooves $i$ and $k$ do not coincide at their adjoining ends by about half the width of a groove. This construction insures a more uniform and even flow of seed than if the grooves were all parallel or continuous, and as the spiral grooves will discharge more rapidly than straight grooves, the arrangement shown brings the straight grooves into use when the feed is first opened, and the spirals come into action as the feed is opened farther.

The shaft $g$ is moved lengthwise, to regulate the feed, by a hand-lever, $l$, that is pivoted on a pin, $m$, on the side of hopper $a$. The lower end of lever $l$ is slotted to pass over a pin, $n$, that projects from a hub, $o$, on shaft $g$. The upper end of $l$ moves adjacent to a curved plate, $p$, attached to the side of hopper $a$, and a screw-pin, $q$, from lever $l$ extends through a slot, $r$, in plate $p$, so that the lever $l$ may be clamped by a thumb-nut, $s$, at any point in the length of slot $r$. The under edge of plate $p$ is notched, as seen at $t$, to indicate the quantity of seed per acre, which will be delivered according to the position of the lever $l$, and the lever $l$ can be clamped in line with the desired notch.

$u$ is a rod fitted to slide in the end plates, $b$, parallel with the shaft $g$. $v\ v$ are gates or valves that are fitted in the discharge-openings $e$ of seed-boxes $c$, and are each connected by an arm, $w$, to the rod $u$. $y$ is an arm connecting rod $u$ with the hub $o$ of shaft $g$, so that the rod $u$ and valves $v$ move simultaneously with shaft $g$, and the spaces between the rollers $h$ and discharge-opening $e$ will be closed by valves $v$, more or less, according as shaft $g$ is moved to alter the feed.

We provide in one of the end plates, $b$, of hopper $a$ a hole, $a'$, in line with shaft $g$, and of the same diameter as rollers $h$, or larger. The shaft $g$ is held central of the opening $a$ by a bearing-plate, $b'$, attached to $b$. By removing plate $b'$ and disconnecting arms $w$ and $n$ from hub $o$, the shaft $g$ and rollers $h$ may be drawn out endwise through opening $h$ for necessary repairs. This construction also facilitates the manufacture of the machine.

It will be seen that the grooved portion of each feed-roller $h$ slides into the cup $f$ of the seed-box when the shaft $g$ is moved lengthwise to shut off the feed, and is covered by the cup.

The length of slot $r$ in the plate $p$ is to be such that the extent of movement allowed by the slot to lever $l$ will be sufficient to entirely open or close the feed.

Having thus described our invention, we claim as new and desire to secure by Letters Patent—

The feed-rollers $h$, provided with parallel grooves and spiral grooves in relation to each other, substantially as and for the purposes described.

WILLIAM THOMAS HILDRUP.
ALBERT TSCHOP.

Witnesses:
I. K. BOYER,
J. GASTROCK.